United States Patent
Kawashima (10) Patent No.: US 9,067,586 B2
(45) Date of Patent: Jun. 30, 2015

(54) HYBRID WORKING MACHINE

(75) Inventor: Koji Kawashima, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 13/821,418

(22) PCT Filed: Oct. 5, 2011

(86) PCT No.: PCT/JP2011/073021
§ 371 (c)(1),
(2), (4) Date: Mar. 7, 2013

(87) PCT Pub. No.: WO2012/046788
PCT Pub. Date: Apr. 12, 2012

(65) Prior Publication Data
US 2013/0190960 A1 Jul. 25, 2013

(30) Foreign Application Priority Data

Oct. 6, 2010 (JP) ................................. 2010-226912

(51) Int. Cl.
| | |
|---|---|
| *B60W 20/00* | (2006.01) |
| *B60W 10/00* | (2006.01) |
| *B60W 10/06* | (2006.01) |
| *B60W 10/08* | (2006.01) |
| *B60W 10/30* | (2006.01) |
| *E02F 9/20* | (2006.01) |
| *E02F 9/22* | (2006.01) |

(52) U.S. Cl.
CPC ............... *B60W 20/10* (2013.01); *B60W 10/06* (2013.01); *B60W 10/08* (2013.01); *B60W 10/30* (2013.01); *B60W 20/00* (2013.01); *B60W 2510/305* (2013.01); *B60W 2710/0644* (2013.01); *B60Y 2200/412* (2013.01); *E02F 9/2075* (2013.01); *E02F 9/2235* (2013.01); *E02F 9/2246* (2013.01); *E02F 9/2285* (2013.01); *E02F 9/2296* (2013.01); *Y02T 10/6286* (2013.01); *B60W 2600/00* (2013.01); *Y10S 903/903* (2013.01); *Y10S 903/93* (2013.01)

(58) Field of Classification Search
CPC ..... B60W 20/00; B60W 20/08; B60W 20/24; E02F 9/20; E02F 9/22; E02F 9/2075
See application file for complete search history.

(56) References Cited

U.S. PATENT DOCUMENTS

| | | | |
|---|---|---|---|
| 6,708,787 B2 * | 3/2004 | Naruse et al. ................. | 180/53.8 |
| 2008/0093865 A1 * | 4/2008 | Komiyama et al. ......... | 290/40 A |

(Continued)

FOREIGN PATENT DOCUMENTS

| | | |
|---|---|---|
| JP | 07-119506 | 5/1995 |
| JP | 2010-116708 | 5/2010 |

(Continued)

OTHER PUBLICATIONS

International Search Report mailed on Jan. 17, 2012.

*Primary Examiner* — John R Olszewski
*Assistant Examiner* — Jason Roberson
(74) *Attorney, Agent, or Firm* — IPUSA, PLLC (57) ABSTRACT

A hybrid working machine includes an engine, a motor generator connected to the engine, a variable displacement hydraulic pump configured to be driven to rotate with the output of the engine, and a control part configured to control the rotation speed of the engine and the variable displacement hydraulic pump. The control part is configured to determine the target rotation speed of the variable displacement hydraulic pump based on a hydraulic load and control the rotation speed of the engine using the target rotation speed.

9 Claims, 11 Drawing Sheets (56) References Cited

U.S. PATENT DOCUMENTS

2010/0115800 A1\* 5/2010 Sakai et al. ................... 37/348
2011/0098873 A1 4/2011 Koga et al.

FOREIGN PATENT DOCUMENTS

JP 2010116708 A \* 5/2010
WO WO2009/157511 12/2009

\* cited by examiner

HYBRID WORKING MACHINE

TECHNICAL FIELD

The present invention relates to hybrid working machines, and more particular to a hybrid working machine that drives a variable flow rate hydraulic pump with the output of an engine.

BACKGROUND ART

In hybrid working machines, the hydraulic pressure supplied to hydraulic actuators (hydraulic cylinders and hydraulic motors) for driving working elements is often generated by a hydraulic pump whose drive source is an engine. In this case, the outputs of hydraulic actuators are determined by the output of the engine.

In common hybrid working machines, the driving of the engine is controlled so that the rotation speed of the engine is always constant. For example, in hybrid hydraulic shovels, the engine torque is low during their operations in a low load mode (a low load state) at the time of driving and swinging an arm, a bucket, etc. Accordingly, in a low load mode, the engine torque is increased to generate an excess torque while the engine rotation speed is kept constant. Electric power is generated by driving a generator with this excess torque, and a battery is charged with the generated electric power. Meanwhile, in a high load mode (a high load state) where a drive torque required by a hydraulic pump is higher than the rated output of the engine, the engine torque is increased while the engine rotation speed is kept constant, and an electric motor is driven with electric power from the battery to add the output of the electric motor to the output of the engine (assisting), thereby obtaining the required drive torque.

When the engine output is caused to vary while the engine rotation speed is kept constant as described above, the engine efficiency varies with the variation of the engine output, so that the fuel consumption rate of the engine also varies. Accordingly, when the engine output is caused to vary while the engine rotation speed is kept constant, the engine is not always operated at a rotation speed that results in a good fuel consumption rate.

Therefore, a hybrid working machine has been proposed that is capable of improving the fuel consumption rate at both a low load time and a high load time by efficiently driving an engine by causing the engine rotation speed to be variable based on the loading condition of the engine.

PRIOR ART DOCUMENT

Patent Document

[Patent Document 1] International Publication No. WO 2009/157511

SUMMARY OF THE INVENTION

Problems to be Solved by the Invention

In the hybrid hydraulic shove disclosed in the above-mentioned patent document 1, the engine rotation speed is made variable in consideration of the engine efficiency, while the efficiency of the hydraulic pump driven by the engine is not taken into consideration.

Here, in the case of taking the efficiency of the hydraulic pump into consideration, assuming that hydraulic fluid is discharged at the same flow rate, the efficiency of the hydraulic pump is lower in the case of reducing the tilt angle ratio and increasing the rotation speed than in the case of increasing the tilt angle ratio and reducing the rotation speed of a variable displacement hydraulic pump. That is, in general, in the case of a piston hydraulic pump, the friction loss of a piston and the friction loss of parts of a power transmission mechanism increase when the piston reciprocates at high speed with a short stroke, so that the pump efficiency is reduced. Thus, the pump efficiency is lower with a smaller tilt angle ratio.

Therefore, there is a demand for the development of hybrid working machines capable of keeping higher efficiency of a hydraulic pump by increasing the tilt angle ratio by reducing the engine rotation speed as much as possible with the flow rate being constant.

Means for Solving the Problems

According to an embodiment of the present invention, a hybrid working machine is provided that includes an engine; a motor generator connected to the engine; a variable displacement hydraulic pump configured to be driven to rotate with an output of the engine; and a control part configured to control a rotation speed of the engine and the variable displacement hydraulic pump, wherein the control part is configured to control the rotation speed of the engine based on a hydraulic load.

Effects of the Invention

According to the above-described invention, it is possible to keep higher pump efficiency of a variable displacement hydraulic pump by increasing the tilt angle ratio by reducing the engine rotation speed as much as possible.

Objects, features and advantages of the present invention will become more apparent from the following detailed description when read with reference to the accompanying drawings.

DESCRIPTION OF EMBODIMENTS

A description is given below, based on the drawings, of embodiments of the present invention.

Figure 1:
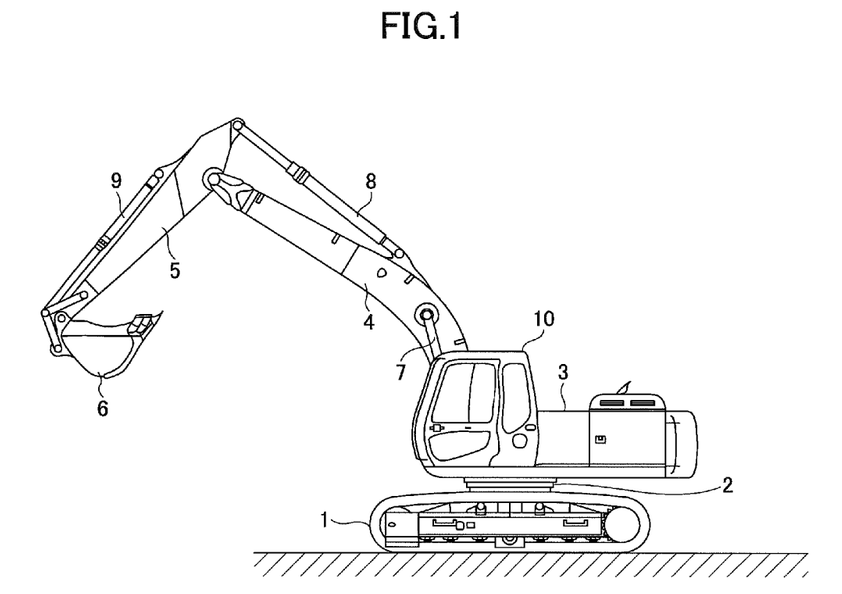
FIG. 1 is a side view of a hybrid hydraulic shovel that is an example hybrid working machine to which the present invention is applied.

FIG. 1 is a side view of a hybrid hydraulic shovel that is an example hybrid working machine to which the present invention is applied. Hybrid working machines to which the present invention is applied are not limited to hybrid hydraulic shovels, and the present invention may be applied to other hybrid working machines as long as they drive a hydraulic pump with an engine.

An upper-part turning body 3 is mounted through a turning mechanism 2 on a lower-part traveling body 1 of the hybrid hydraulic shovel illustrated in FIG. 1. A boom 4 is attached to the upper-part turning body 3. An arm 5 is attached to the end of the boom 4. A bucket 6 is attached to the end of the arm 5. The boom 4, the arm 5, and the bucket 6 are hydraulically driven by a boom cylinder 7, an arm cylinder 8, and a bucket cylinder 9, respectively. A cabin 10 is provided on and power sources such as an engine are mounted in the upper-part turning body 3.

Figure 2:
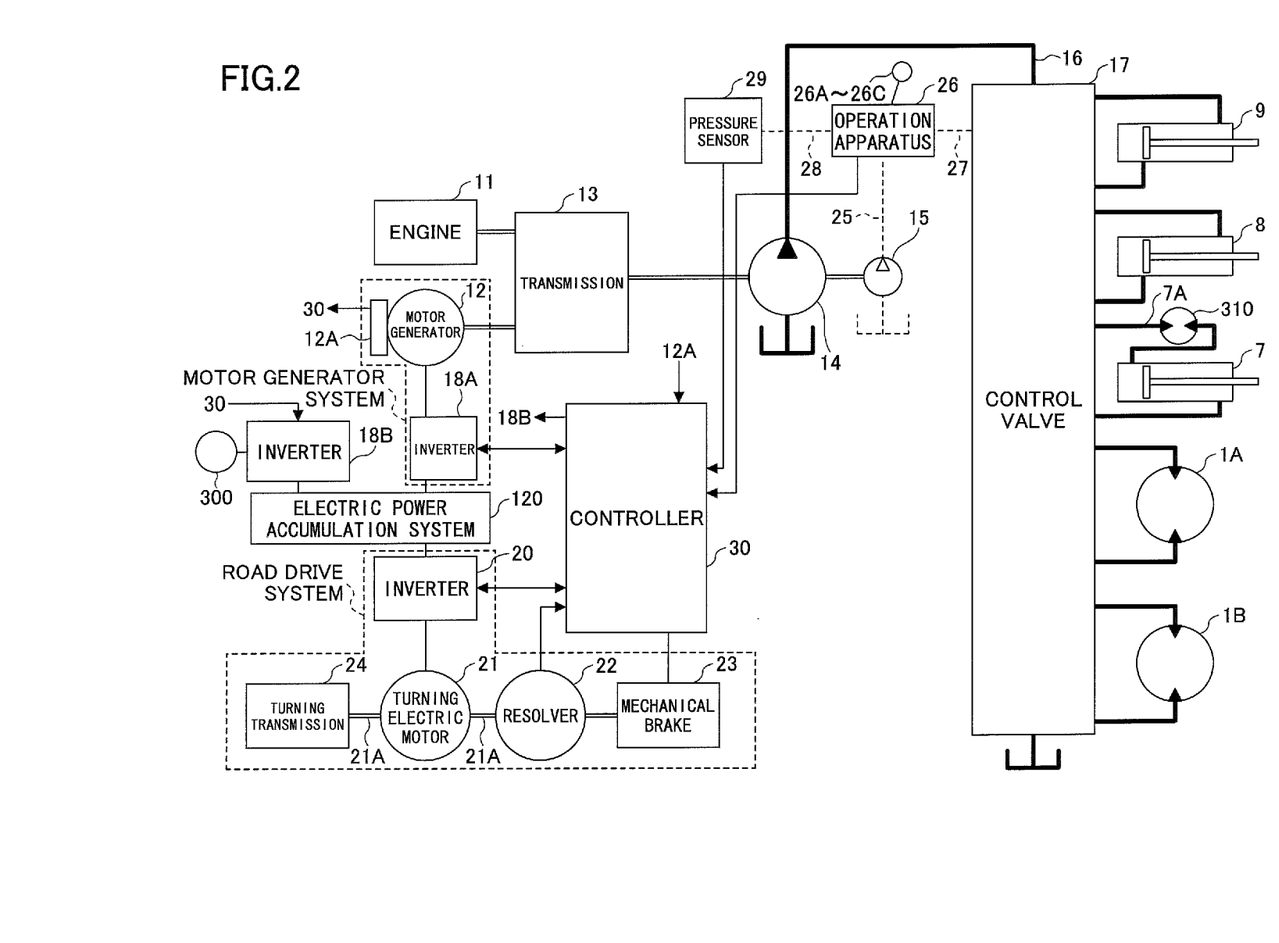
FIG. 2 is a block diagram illustrating a configuration of a drive system of the hybrid hydraulic shovel illustrated in FIG. 1.

FIG. 2 is a block diagram illustrating a configuration of a drive system of the hybrid hydraulic shovel illustrated in FIG. 1. In FIG. 2, a double line, a bold solid line, a broken line, and a fine solid line indicate a mechanical power system, a high-pressure hydraulic line, a pilot line, and an electric drive and control system, respectively.

An engine 11 as a mechanical drive part and a motor generator 12 as an assist drive part are connected to two input shafts of a transmission 13. A main pump 14 and a pilot pump 15 are connected as hydraulic pumps to the output shaft of the transmission 13. A control valve 17 is connected to the main pump 14 via a high-pressure hydraulic line 16. The hydraulic pump (main pump) 14 is a variable displacement hydraulic pump, and its discharge flow rate may be controlled by adjusting the stroke length of a piston by controlling the angle of a swash plate (a tilt angle). Hereinafter, the variable displacement hydraulic pump 14 may also be simply referred to as "hydraulic pump 14."

The control valve 17 is a controller that controls a hydraulic system in the hybrid shovel. Hydraulic motors 1A (right) and 1B (left) for the lower-part traveling body 1, the boom cylinder 7, the arm cylinder 8, and the bucket cylinder 9 are connected to the control valve 17 via high-pressure hydraulic lines. Further, a turning hydraulic motor 2A for driving the turning mechanism 2 also is connected to the control valve 17.

An electric power accumulation system 120 including an electric power accumulator is connected to the motor generator 12 via an inverter 18A. Further, an operation apparatus 26 is connected to the pilot pump 15 via a pilot line 25. The operation apparatus 26 includes a lever 26A, a lever 26B, and a pedal 26C. The lever 26A, the lever 26B, and the pedal 26C are connected to the control valve 17 and a pressure sensor 29 via hydraulic lines 27 and 28, respectively. The pressure sensor 29 is connected to a controller 30 that controls the driving of the electric system.

The controller 30 controls the operation (switches the electric motor [assist] operation and the generator operation) of the motor generator 12, and also controls the charge and discharge of the electric power accumulator (capacitor) by controlling the driving of a step-up/step-down converter as a step-up/step-down control part. The controller 30 controls the charge and discharge of the electric power accumulator (capacitor) by controlling the switching of the step-up operation and the step-down operation of the step-up/step-down converter based on the state of charge of the electric power accumulator (capacitor) and the operating state (electric motor [assist] operation or generator operation) of the motor generator 12.

The switching of the step-up operation and the step-down operation of the step-up/step-down converter is controlled based on the DC bus voltage value detected by a DC bus voltage detecting part provided in a DC bus, the electric power accumulator voltage value detected by an electric power accumulator voltage detecting part, and the electric power accumulator electric current value detected by an electric power accumulator electric current detecting part.

Further, the SOC of the electric power accumulator (capacitor) is calculated based on the electric power accumulator voltage value detected by the electric power accumulator voltage detecting part.

Further, while the capacitor is illustrated as an example of the electric power accumulator in the above description, rechargeable batteries such as lithium ion batteries or other forms of power supplies capable of exchanging electric power may replace the capacitor as the electric power accumulator.

The hybrid hydraulic shovel illustrated in FIG. 2 has an electric turning mechanism, and is provided with a turning electric motor 21 in order to drive the turning mechanism 2. The turning electric motor 21 as an electric working element is connected to the electric power accumulation system 120 via an inverter 20. A resolver 22, a mechanical brake 23, and a turning transmission 24 are connected to a rotating shaft 21A of the turning electric motor 21. The turning electric motor 21, the inverter 20, the resolver 22, the mechanical brake 23, and the turning transmission 24 constitute a load drive system.

In addition to the above-described configuration, a hydraulic motor 310 may be provided in a middle portion of a hydraulic pipe 7A to the boom cylinder 7 in order to perform boom regeneration. In this case, the hydraulic motor 310 is mechanically connected to a generator 300, so that when the hydraulic motor 310 is driven, the generator 300 is driven with its rotational force. The generator 300 is electrically connected to the electric power accumulation system 120 via an inverter 18B.

In the above-described boom regeneration mechanism, when the boom 4 lowers, hydraulic fluid returns from the boom cylinder 7 to the control valve 17. The hydraulic motor 310 is driven with this returning hydraulic fluid to generate a rotational force (torque). This rotational force is transmitted to the generator 300, so that the generator 300 is driven to generate electric power. The electric power generated in the generator 300 is supplied to the DC bus of the electric power accumulation system 120 via the inverter 18B.

The present invention has a feature of variably controlling the rotation speed of the engine 11 so as to increase the tilt angle ratio X (a parameter that represents the tilt of the swash plate) of the variable displacement hydraulic pump 14 as much as possible in the hybrid hydraulic shovel of the above-described configuration. In order to increase the tilt angle ratio X of the variable displacement hydraulic pump 14 as much as possible, the engine 11 is controlled to reduce its rotation speed as much as possible.

Figure 3:
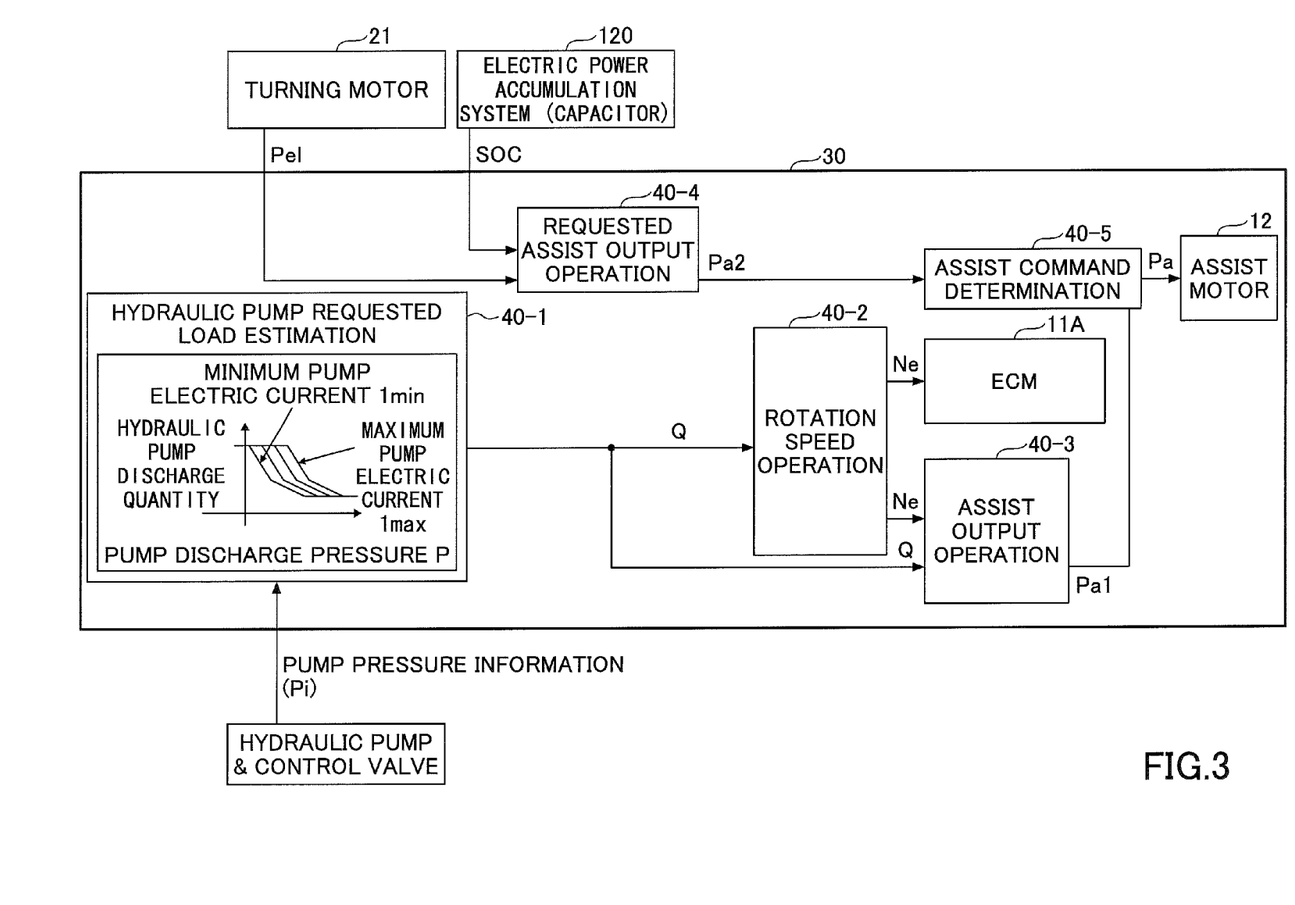
FIG. 3 is a control function block diagram of a rotation speed variable control algorithm according to a first embodiment of the present invention.

Next, a description is given of a rotation speed variable control algorithm in a hybrid working machine according to a first embodiment of the present invention. FIG. 3 is a control function block diagram of a rotation speed variable control algorithm according to the first embodiment of the present invention. Control according to this rotation speed variable control algorithm is performed by the controller 30.

First, in a hydraulic pump requested load estimation block 40-1, a pump discharge quantity V is determined from a pump horsepower control P-Q diagram using the discharge pressure Pi and the pump control current I of the hydraulic pump 21. The target discharge flow rate Q of the hydraulic pump 14 is calculated by multiplying the determined pump discharge quantity V by a pump rotation speed (rpm). That is, the target discharge flow rate Q to be output by the hydraulic pump 14 is determined from the requested hydraulic load. The discharge pressure Pi, the pump control current I, and the pump rotation speed (rpm) of the hydraulic pump 21 are used as values that represent a hydraulic load. The target discharge flow rate Q determined in the hydraulic pump requested load estimation block 40-1 is fed to a rotation speed operation block 40-2.

Figure 4:
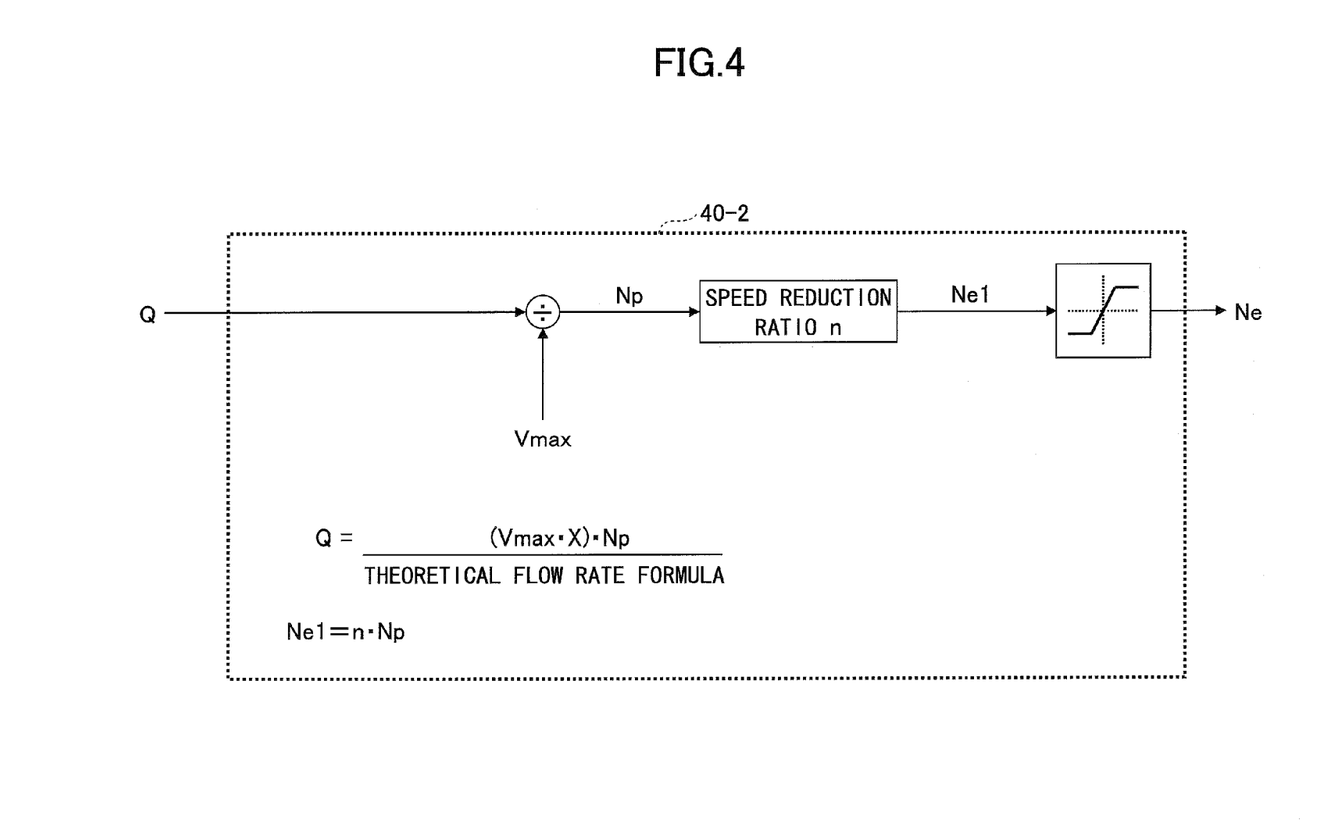
FIG. 4 is a diagram illustrating an operation algorithm of a process executed in a rotation speed operation block.

FIG. 4 is a diagram illustrating an operation algorithm of a process executed in the rotation speed operation block 40-2. In the rotation speed operation block 40-2, a pump rotation speed at the time of a pump maximum tilt angle ratio is determined by dividing the fed target discharge flow rate Q by a pump volume Vmax at the time of the maximum tilt angle ratio. That is, a pump rotation speed Np is determined that is necessary for the hydraulic pump 14 to output the target discharge flow rate Q when the tilt angle ratio X of the hydraulic pump 14 is set to the maximum value (maximum tilt angle ratio) Xmax. Then, an engine rotation speed Ne1 is determined by multiplying the determined pump rotation speed Np by a speed reduction ratio n, which is the ratio of the rotation speed of the engine 11 to the rotation speed of the hydraulic pump 14. That is, the determined engine rotation speed Ne1 is an engine rotation speed necessary to drive the hydraulic pump 14 at the pump rotation speed necessary to output the target discharge flow rate Q when the tilt angle ratio X of the hydraulic pump 14 is maximized. Then, it is determined whether the determined engine rotation speed Ne1 is within the range of allowable rotation speeds of the engine 11. If the engine rotation speed Ne1 is within the range of allowable rotation speeds, the engine rotation speed Ne1 as determined is output as an engine rotation speed command Ne. If the engine rotation speed Ne1 is lower than a minimum allowable rotation speed, the minimum allowable rotation speed is output as the engine rotation speed command Ne. If the engine rotation speed Ne1 is higher than a maximum allowable rotation speed, the maximum allowable rotation speed is output as the engine rotation speed command Ne.

For example, in the case of a low hydraulic load, the target discharge flow rate Q is reduced, so that the engine rotation speed Ne1 may be excessively reduced to cause an engine stall. Therefore, when the engine rotation speed Ne1 is lower than the minimum allowable rotation speed, the minimum allowable rotation speed is output as the engine rotation speed command Ne as described above, thereby setting a limit to the engine rotation speed so as to prevent the engine rotation speed from becoming too low.

The engine rotation speed at the time of having the tilt angle ratio X set to the maximum value Xmax (X=100%) is determined in order to increase the piston stroke length as much as possible. However, it is important to increase the piston stroke length as much as possible, and the tilt angle ratio X does not necessarily have to be the maximum tilt angle ratio Xmax. For example, it is possible to improve the efficiency by increasing the piston stroke length by causing the tilt angle ratio X to be higher than or equal to 90% (90 to 100%). That is, it is possible to improve the efficiency by driving a hydraulic pump with a larger piston stroke length by setting a tilt angle ratio higher than the tilt angle ratio used in the conventional control. Further, according to the present invention, the pump target discharge flow rate Q is calculated using the pump horsepower control P-Q diagram, and the engine rotation speed command Ne is calculated based on the calculated pump target discharge flow rate Q. Thus, according to the present invention, the engine rotation speed command Ne is calculated in consideration of a pump characteristic. Therefore, it is possible to make the same movements as the hydraulic construction machine, so that it is possible to prevent an operator from having a feeling of discomfort.

The engine rotation speed command Ne output from the rotation speed operation block 40-2 is fed to an engine control unit (ECM) 11A that controls the driving of the engine 11. The engine control unit (ECM) 11A feeds the engine 11 with fuel so as to achieve the rotation speed indicated by the fed engine rotation speed command Ne. Further, the engine rotation speed command Ne output from the rotation speed operation block 40-2 is also fed to an assist output operation block 40-3.

Figure 5:
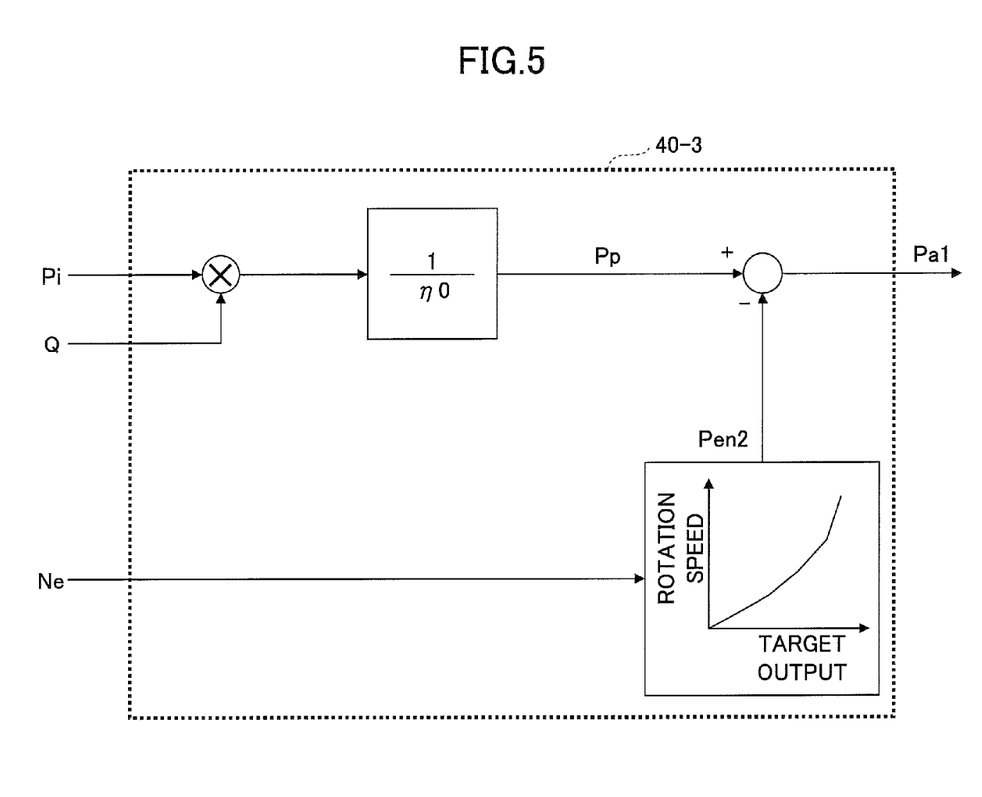
FIG. 5 is a diagram illustrating an operation algorithm of a process executed in an assist output operation block.

The assist output operation block 40-3 is also fed with the target discharge flow rate Q determined in the hydraulic pump requested load estimation block 40-1. FIG. 5 is a diagram illustrating an operation algorithm of a process executed in the assist output operation block 40-3. In the assist output operation block 40-3, a hydraulic pump output (on the shaft output side) Wout is determined by multiplying the target discharge flow rate Q by the hydraulic pump discharge pressure Pi. Then, a hydraulic load requested output Pp is determined by dividing the determined hydraulic pump output (on the shaft output side) Wout by a pump overall efficiency $\eta 0$. The hydraulic load requested output Pp corresponds to a hydraulic pump output (on the shaft input side) Win.

Further, in the assist output operation block 40-3, an engine target output Pen2 is determined from the engine rotation speed command Ne fed from the rotation speed operation block 40-2. Then, an engine compensation assist amount Pa1 is determined by subtracting the engine target output Pen 2 from the hydraulic load requested output Pp determined as described above. When the hydraulic load requested output Pp is greater than the engine target output Pen2, the engine compensation assist amount Pa1 becomes a positive value, which corresponds to the assist amount of the motor generator 12, which is an assist motor. The engine compensation assist amount Pa1 output from the assist output operation block 40-3 is fed to an assist command determination block 40-5.

Figure 6:
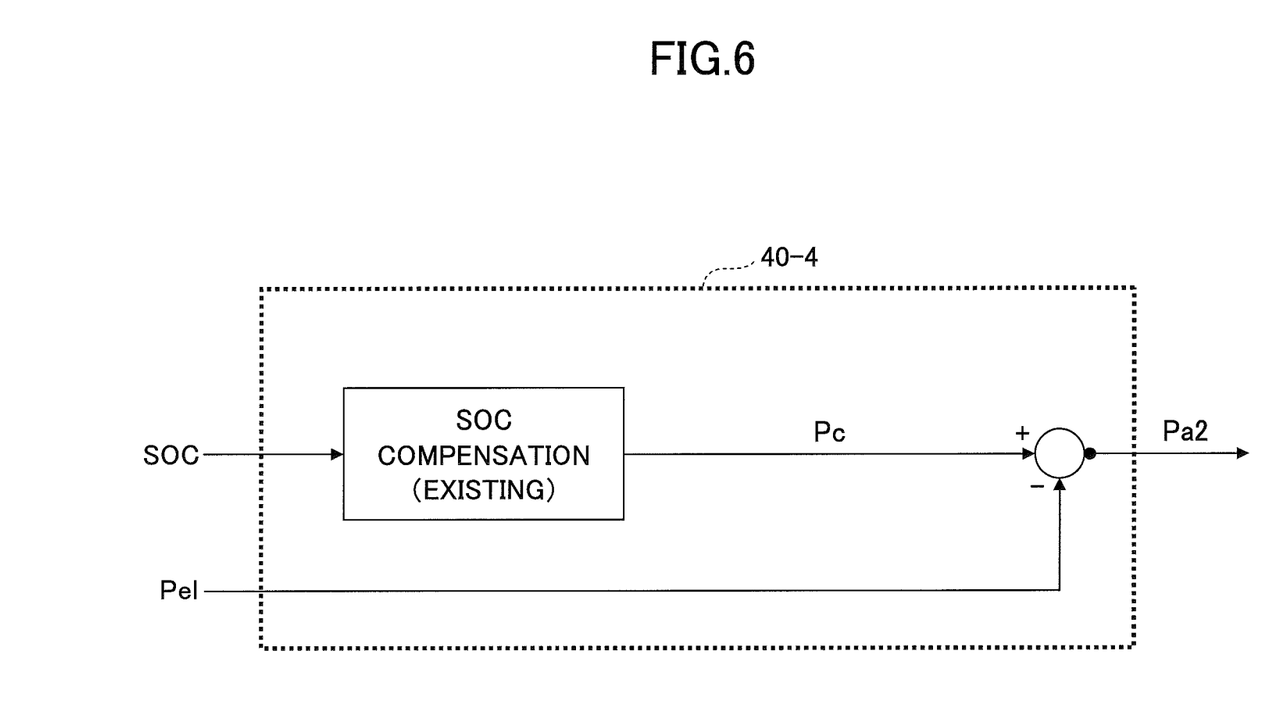
FIG. 6 is a diagram illustrating an operation algorithm of a process executed in a requested assist output operation block

Here, in a requested assist output operation block 40-4, an electric power accumulator compensation assist amount Pa2 is determined from the electrical load requested output Pe1 of the turning electric motor 21 and the state of charge (SOC) of the electric power accumulator (capacitor) of the electric power accumulation system 120. FIG. 6 is a diagram illustrating an operation algorithm of a process executed in the requested assist output operation block 40-4. An electric power accumulator target output Pc that may be output by the electric power accumulator at present is determined from the state of charge (SOC) of the electric power accumulator (capacitor) of the electric power accumulation system 120. Then, the electric power accumulator compensation assist amount Pa2 is determined by subtracting the electrical load requested output Pe1 from the electric power accumulator target output Pc. That is, the electric power accumulator compensation assist amount Pa2 is electric power determined by subtracting the electric power required by the turning electric motor 12, which is an electrical load, from the electric power that may be output by the electric power accumulator at present, and corresponds to the maximum electric power that may be fed to the motor generator 12 as an assist motor. The electric power accumulator compensation assist amount Pa2 output from the requested assist output operation block 40-4 is fed to the assist command determination block 40-5.

Thus, the assist command determination block 40-5 is fed with the engine compensation assist amount Pa1 and the electric power accumulator compensation assist amount Pa2. The assist command determination block 40-5 selects the larger one of the engine compensation assist amount Pa1 and the electric power accumulator compensation assist amount Pa2. The selected engine compensation assist amount Pa1 or electric power accumulator compensation assist amount Pa2 is output to the motor generator 12 as an output command Pa to the motor generator 12 as an assist motor.

If the turning mechanism 2 is driven not electrically but hydraulically, there is no electrical load as a working element, and the electrical load requested output Pe1 is zero. Accordingly, in the requested assist output operation block 40-4, the electric power accumulator target output Pc determined from the state of charge SOC of the electric power accumulator is directly output as the electric power accumulator compensation assist amount Pat. Further, in the case of performing boom regeneration, the electrical load requested output Pe1 includes the generated electric power generated in the generator 300 for boom regeneration.

Thus, according to the rotation speed variable control algorithm according to this embodiment, the engine rotation speed command Ne is determined based on the engine rotation speed Ne1 at the time when the tilt angle ratio X of the hydraulic pump 14 is the maximum value Xmax. Accordingly, it is possible to drive the hydraulic pump 14 with a high tilt angle ratio, so that it is possible to maintain good hydraulic pump efficiency. The assist amount of the motor generator 12 as an assist motor is determined from the thus determined engine rotation speed command Ne and the state of charge SOC of the electric power accumulator, so that it is possible for the motor generator 12 to perform a suitable engine assist.

Figure 7:
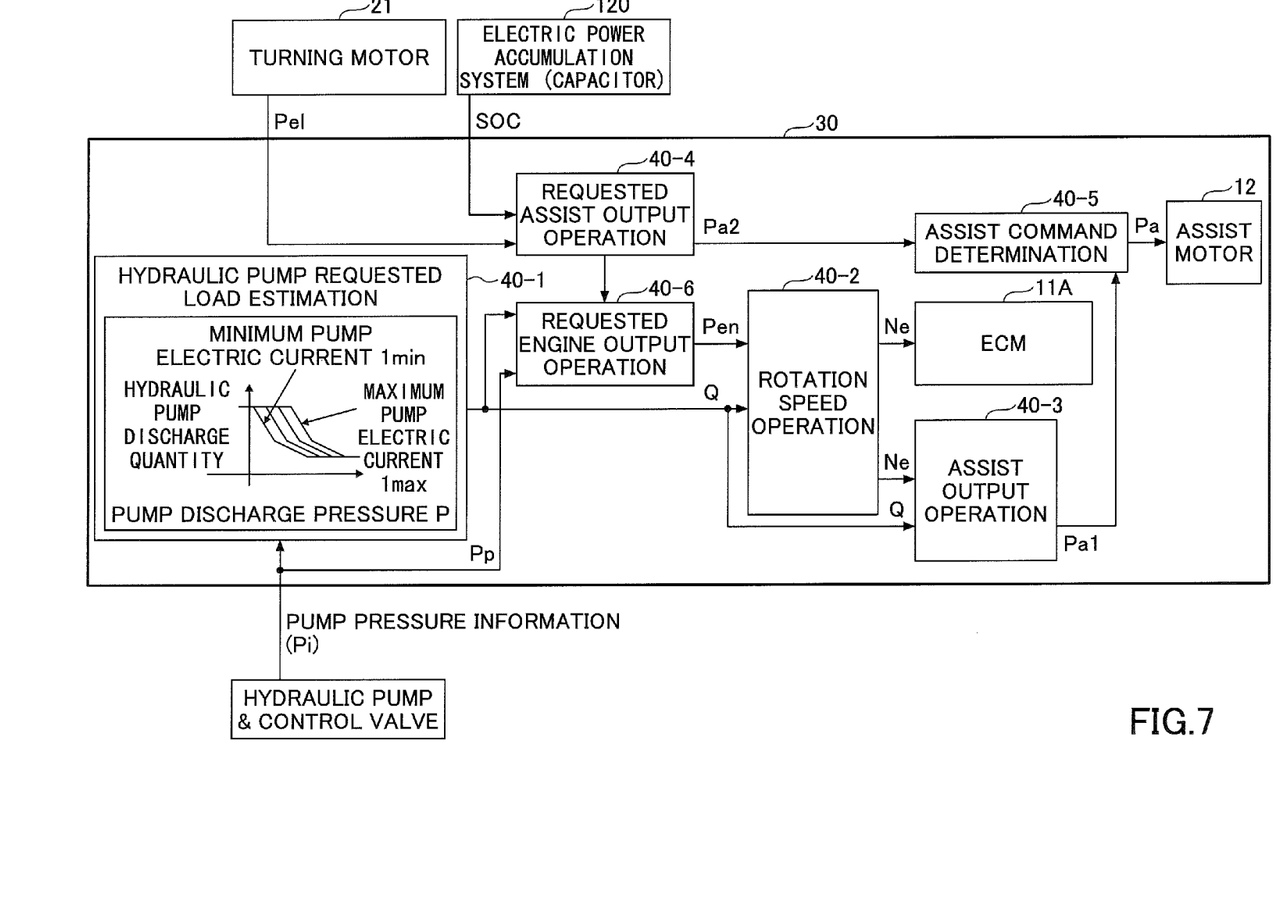
FIG. 7 is a control function block diagram of a rotation speed variable control algorithm according to a second embodiment of the present invention.

Next, a description is given of a second embodiment of the present invention. FIG. 7 is a control function block diagram of a rotation speed variable control algorithm according to the second embodiment of the present invention. Control according to this rotation speed variable control algorithm is performed by the controller 30. In FIG. 7, the same components as those illustrated in FIG. 3 are given the same symbols, and their descriptions are omitted.

In the rotation speed variable control algorithm according to this embodiment, after determining a requested engine output Pen as power to be output by the engine 11, the larger one of an engine rotation speed Ne2 determined from the requested engine output Pen and the engine rotation speed Ne1 determined from the target discharge flow rate Q is selected, and the selected engine rotation speed is determined as the engine rotation speed command Ne.

Figure 8:
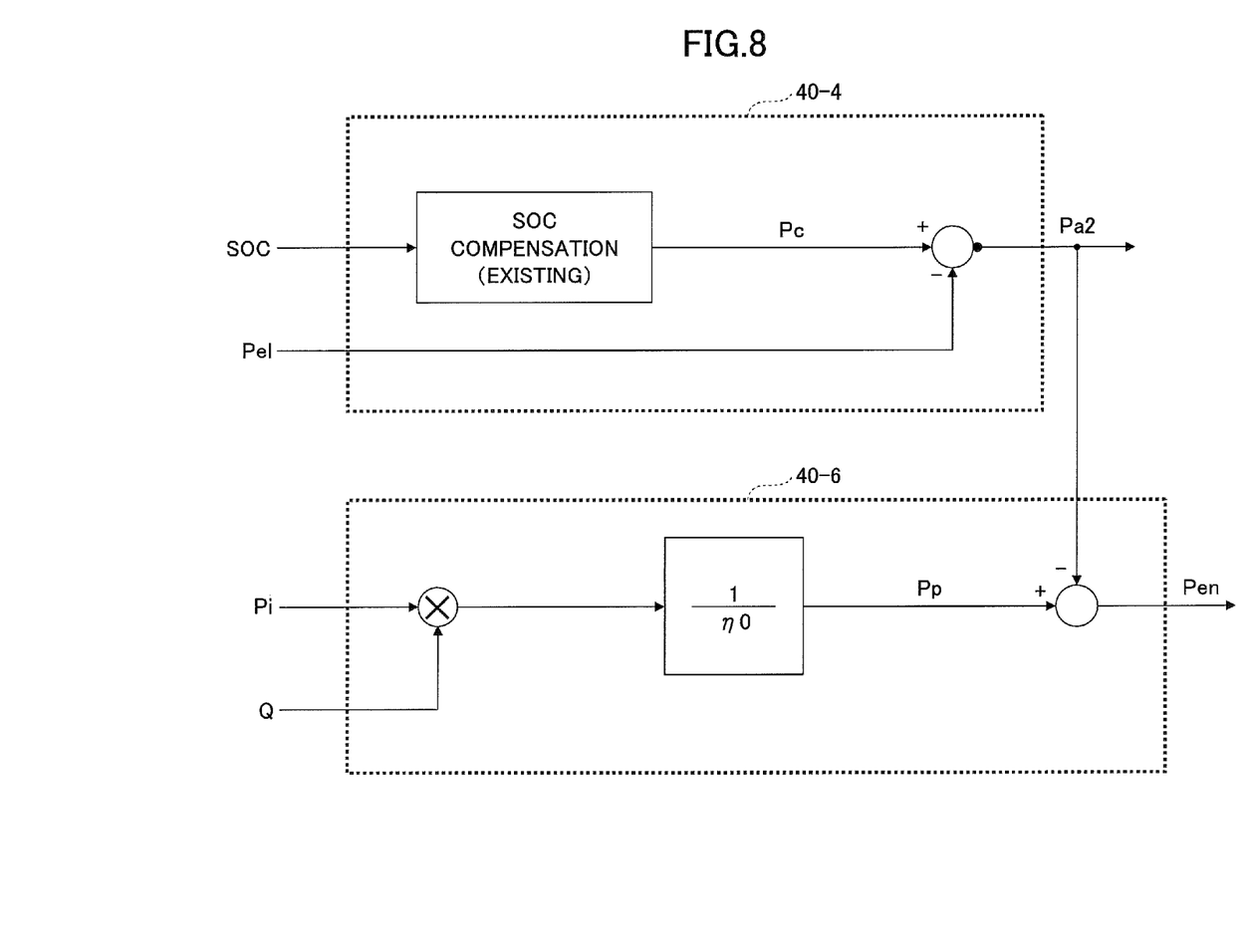
FIG. 8 is a diagram illustrating an operation algorithm of a process executed in a requested engine output operation block.

Accordingly, in this embodiment, a requested engine output operation block 40-6 is provided between the hydraulic pump requested load estimation block 40-1 and the rotation speed operation block 40-2. FIG. 8 is a diagram illustrating an operation algorithm of a process executed in the requested engine output operation block 40-6. FIG. 8 also illustrates the operation algorithm of the process executed in the requested assist output operation block 40-4. However, the operation algorithm of the process executed in the requested assist output operation block 40-4 is the same as that described above in the first embodiment, and its description is omitted.

In the requested engine output operation block 40-6, the hydraulic pump output (on the shaft output side) Wout is determined by multiplying the target discharge flow rate Q fed from the hydraulic pump requested load estimation block 40-1 by the hydraulic pump discharge pressure Pi. Then, the hydraulic load requested output Pp is determined by dividing the determined hydraulic pump output (on the shaft output side) Wout by the pump overall efficiency $\eta 0$. The hydraulic load requested output Pp corresponds to the hydraulic pump output (on the shaft input side) Win. Here, the electric power accumulator compensation assist amount Pa2 determined in the requested assist output operation block 40-4 is subtracted from the determined hydraulic load requested output Pp, and the difference is output to the rotation speed operation block 40-2 as the requested engine output Pen. By subtracting the electric power accumulator compensation assist amount Pa2 from the hydraulic load requested output Pp, it is possible to accurately determine the requested engine output Pen to be output by the engine 11.

The process in the rotation speed operation block 40-2 is different from the process in the above-described first embodiment. In this embodiment, the requested engine output Pen is determined in the requested engine output operation block 40-6. Therefore, in the rotation speed operation block 40-2, a process is executed that determines the engine rotation speed command Ne from the requested engine output Pen.

Figure 9:
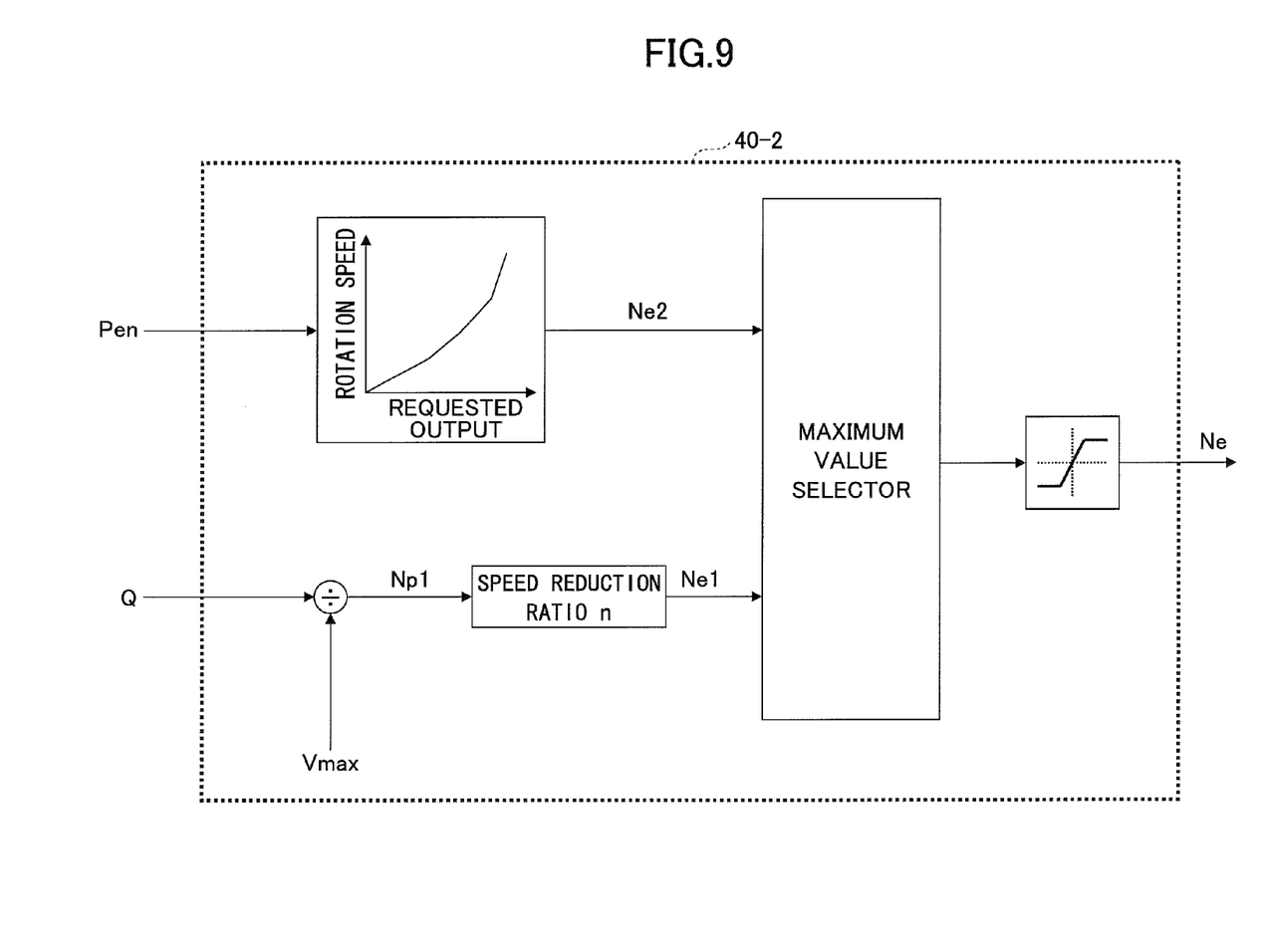
FIG. 9 is a diagram illustrating an operation algorithm of a process executed in the rotation speed operation block in the second embodiment.

FIG. 9 is a diagram illustrating an operation algorithm of a process executed in the rotation speed operation block 40-2 in the second embodiment. Like in the above-described first embodiment, the engine rotation speed Ne1 is determined from the target discharge flow rate Q in the rotation speed operation block 40-2. The determined engine rotation speed Ne1 is fed to a maximum value selector. Meanwhile, an engine rotation speed Ne2 is determined from the requested engine output Pen fed from the requested engine output operation block 40-6, based on the relationship between the engine output and the minimum engine rotation speed. That is, the minimum engine rotation speed necessary to output the requested engine output Pen is the engine rotation speed Ne2. The engine rotation speed Ne2 is fed to the maximum value selector. The maximum value selector selects the larger one of the engine rotation speed Ne1 determined from the target discharge flow rate Q and the engine rotation speed Ne2 determined from the requested engine output Pen.

The reasons for selecting the larger one of the engine rotation speed Ne1 determined from the target discharge flow rate Q and the engine rotation speed Ne2 determined from the requested engine output Pen are as follows.

That is, the engine rotation speed Ne1 determined from the target discharge flow rate Q is an engine rotation speed at which the target discharge flow rate Q may be obtained with the tilt angle ratio X of the hydraulic pump 14 being the maximum value (maximum tilt angle ratio) Xmax, and does not take the output characteristic of the engine 11 into consideration. The maximum output at a certain rotation speed is determined by the output characteristic of the engine 11. The requested output of the engine 11 corresponds to the product of the discharge flow rate and the discharge pressure of the hydraulic pump 14. Therefore, even in the case of the same requested output, conditions vary from the case of a low pressure and a high flow rate to the case of a high pressure and a low flow rate. Accordingly, under the condition of the same tilt angle ratio, the rotation speed for obtaining the requested output is high in the case of a low pressure and a high flow rate, while the rotation speed for obtaining the requested output is low in the case of a high pressure and a low flow rate.

The engine rotation speed Ne2 determined from the requested engine output Pen does not take the tilt angle ratio X of the hydraulic pump 14 into consideration and is merely a rotation speed at which the output requested of the engine 11 may be obtained, and is the maximum output that the engine 11 may generate at a certain rotation speed.

Accordingly, the engine rotation speed Ne1 determined based on the maximum tilt angle ratio Xmax and the engine rotation speed Ne2 determined from the requested engine output Pen are not always the same. The engine rotation speed Ne1 determined from the relationship between the discharge flow rate and the discharge pressure of the hydraulic pump 14 based on the maximum tilt angle ratio Xmax may be lower than the engine rotation speed Ne2 determined from the requested engine output Pen. In this case, if the engine rotation speed Ne1 determined based on the maximum tilt angle ratio Xmax is determined as the engine rotation speed command Ne, the engine rotation speed may be too low for the engine 11 to generate the requested engine output Pen.

Therefore, in this embodiment, by comparing and adopting the larger one of the engine rotation speed Ne1 determined based on the maximum tilt angle ratio Xmax and the engine rotation speed Ne2 determined from the requested engine output Pen, the engine 11 is caused to generate the requested output at that rotation speed without fail.

It is determined whether the thus selected engine rotation speed Ne1 or Ne2 is within the range of allowable rotation speeds of the engine 11. If the selected engine rotation speed Ne1 or Ne2 is within the range of allowable rotation speeds, the selected engine rotation speed Ne1 or Ne2 is directly output as the engine rotation speed command Ne. If the selected engine rotation speed Ne1 or Ne2 is lower than a minimum allowable rotation speed, the minimum allowable rotation speed is output as the engine rotation speed command Ne. If the selected engine rotation speed Ne1 or Ne2 is higher than a maximum allowable rotation speed, the maximum allowable rotation speed is output as the engine rotation speed command Ne.

The engine rotation speed command Ne output from the rotation speed operation block 40-2 is fed to the assist output operation block 40-3. Like in the first embodiment, the hydraulic pump output (on the shaft output side) Wout is determined by multiplying the target discharge flow rate Q by the hydraulic pump discharge pressure Pi in the assist output operation block 40-3. Then, the hydraulic load requested output Pp is determined by dividing the determined hydraulic pump output (on the shaft output side) Wout by the pump overall efficiency η0. The hydraulic load requested output Pp corresponds to the hydraulic pump output (on the shaft input side) Win.

Further, in the assist output operation block 40-3, an engine target output Pen2 is determined from the engine rotation speed command Ne fed from the rotation speed operation block 40-2. Then, the engine compensation assist amount Pa1 is determined by subtracting the engine target output Pent from the hydraulic load requested output Pp determined as described above. When the hydraulic load requested output Pp is greater than the engine target output Pen2, the engine compensation assist amount Pa1 becomes a positive value, which corresponds to the assist amount of the motor generator 12, which is an assist motor. The engine compensation assist amount Pa1 output from the assist output operation block 40-3 is fed to the assist command determination block 40-5.

Here, like in the above-described first embodiment, the electric power accumulator compensation assist amount Pa2 is determined from the electrical load requested output Pe1 of the turning electric motor 21 and the state of charge (SOC) of the electric power accumulator (capacitor) of the electric power accumulation system 120 in the requested assist output operation block 40-4. The electric power accumulator compensation assist amount Pa2 output from the requested assist output operation block 40-4 is fed to the assist command determination block 40-5.

Thus, the assist command determination block 40-5 is fed with the engine compensation assist amount Pa1 and the electric power accumulator compensation assist amount Pa2. The assist command determination block 40-5 selects the larger one of the engine compensation assist amount Pa1 and the electric power accumulator compensation assist amount Pa2. The selected engine compensation assist amount Pa1 or electric power accumulator compensation assist amount Pa2 is output to the motor generator 12 as the output command Pa to the motor generator 12 as an assist motor.

If the turning mechanism 2 is driven not electrically but hydraulically, there is no electrical load as a working element, and the electrical load requested output Pe1 is zero. Accordingly, in the requested assist output operation block 40-4, the electric power accumulator target output Pc determined from the state of charge SOC of the electric power accumulator is directly output as the electric power accumulator compensation assist amount Pa2.

Thus, according to the rotation speed variable control algorithm according to this embodiment, the engine rotation speed command Ne is determined based on the engine rotation speed Ne1 at the time when the tilt angle ratio X of the hydraulic pump 14 is the maximum value Xmax. Accordingly, it is possible to drive the hydraulic pump 14 with a high tilt angle ratio, so that it is possible to maintain good hydraulic pump efficiency. The assist amount of the motor generator 12 as an assist motor is determined from the thus determined engine rotation speed command Ne and the state of charge SOC of the electric power accumulator, so that it is possible for the motor generator 12 to perform a suitable engine assist. Further, because the requested engine output Pen is taken into consideration in determining the engine rotation speed command Ne, it is possible to more suitably determine the engine rotation speed command Ne.

Next, a description is given of a third embodiment of the present invention. A rotation speed variable control algorithm according to the third embodiment of the present invention is basically equal to the rotation speed variable control algorithm illustrated in FIG. 7, but is different therefrom in the process of the rotation speed operation block 40-2.

In the rotation speed variable control algorithm according to this embodiment, after determining the requested engine output Pen as power to be output by the engine 11, the larger one of the engine rotation speed Ne2 determined from the requested engine output Pen and the engine rotation speed Ne1 determined from the target discharge flow rate Q is selected, and the selected engine rotation speed is determined as the engine rotation speed command Ne. This is the same as the process in the rotation speed operation block 40-2 of the rotation speed variable control algorithm according to the above-described second embodiment. This embodiment, however, is different in taking the pumping loss of the hydraulic pump 14 into consideration in determining the engine rotation speed Ne1 from the target discharge flow rate Q.

That is, while the volume Vmax at the time of the maximum tilt angle ratio is used in determining the pump rotation speed Np at the time of the maximum pump tilt angle ratio in the above-described second embodiment, the volume Vmax is a theoretical value obtained from the piston stroke length in the case of the maximum tilt angle ratio Xmax, so that actually, a loss due to the compressibility or spilling of hydraulic fluid is generated. Accordingly, in the case of the maximum tilt angle ratio Xmax, the volume of hydraulic fluid actually discharged from a cylinder is the theoretical volume Vmax minus the pumping loss. Therefore, in this embodiment, by using a value obtained by subtracting the loss from the theoretical volume Vmax as a pump volume V, the engine rotation speed command Ne1 is more accurately determined taking the pumping loss into consideration.

Figure 10:
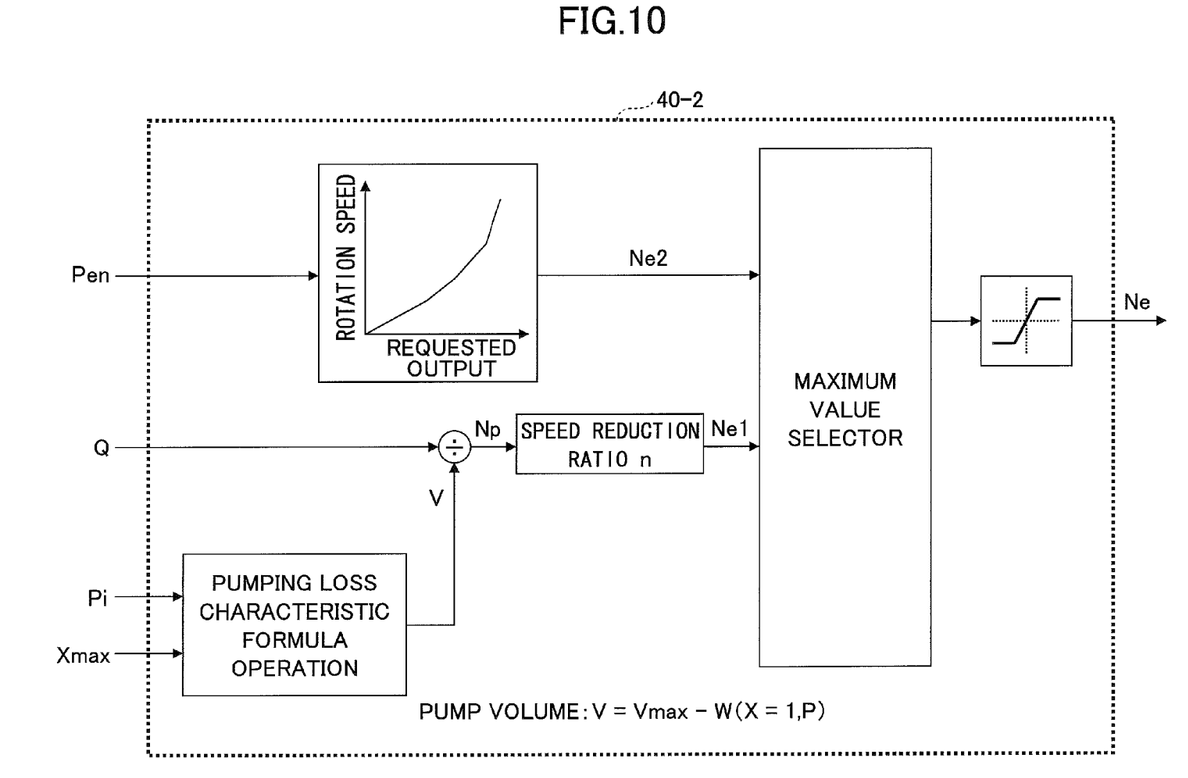
FIG. 10 is a diagram illustrating an operation algorithm of a process executed in the rotation speed operation block in a third embodiment.

FIG. 10 is a diagram illustrating an operation algorithm of a process executed in the rotation speed operation block 40-2 in the third embodiment. Like in the above-described second embodiment, the larger one of the engine rotation speed Ne1 determined from the target discharge flow rate Q and the engine rotation speed Net determined from the requested engine output Pen is selected and output as the engine rotation speed command Ne in the rotation speed operation block 40-2. However, in determining the engine rotation speed Ne1 from the target discharge flow rate Q, the pump volume V is determined by subtracting a pumping loss by a pumping loss characteristic operation (V=Vmax−W (X=1, P)), and the pump rotation speed Np at the time of the maximum pump tilt angle ratio is calculated by dividing the target discharge flow rate Q by the determined pump volume V.

The pumping loss depends on the discharge pressure Pi and the tilt angle ratio X (that is, the piston stroke length), and is therefore determined as a function of the discharge pressure Pi and the tilt angle ratio X. Here, while the tilt angle ratio X is a variable, it is assumed that the tilt angle ratio X is fixed to the maximum tilt angle ratio Xmax=1. This is because at the time of the maximum tilt angle ratio Xmax, the piston stroke length is maximized and the loss dependent on the piston stroke length is also maximized, so that the loss is calculated in expectation of the maximum loss. In the above-described pumping loss characteristic operation (V=Vmax−W (X=1, P)), W is a pumping loss, X=1 corresponds to the maximum tilt angle ratio Xmax, and P corresponds to the discharge pressure Pi.

Thus, according to the rotation speed variable control algorithm according to this embodiment, the engine rotation speed command Ne is determined based on the engine rotation speed Ne1 at the time when the tilt angle ratio X of the hydraulic pump 14 is the maximum value Xmax and the pumping loss is taken into consideration. Accordingly, it is possible to drive the hydraulic pump 14 with a high tilt angle ratio X, so that it is possible to keep an efficient operating state of the hydraulic pump 14. Further, the assist amount of the motor generator 12 as an assist motor is determined from the thus determined engine rotation speed command Ne and the state of charge SOC of the electric power accumulator, so that it is possible for the motor generator 12 to perform a suitable engine assist. Further, because the requested engine output Pen is taken into consideration in determining the engine rotation speed command Ne, it is possible to more suitably determine the engine rotation speed command Ne.

Figure 11:
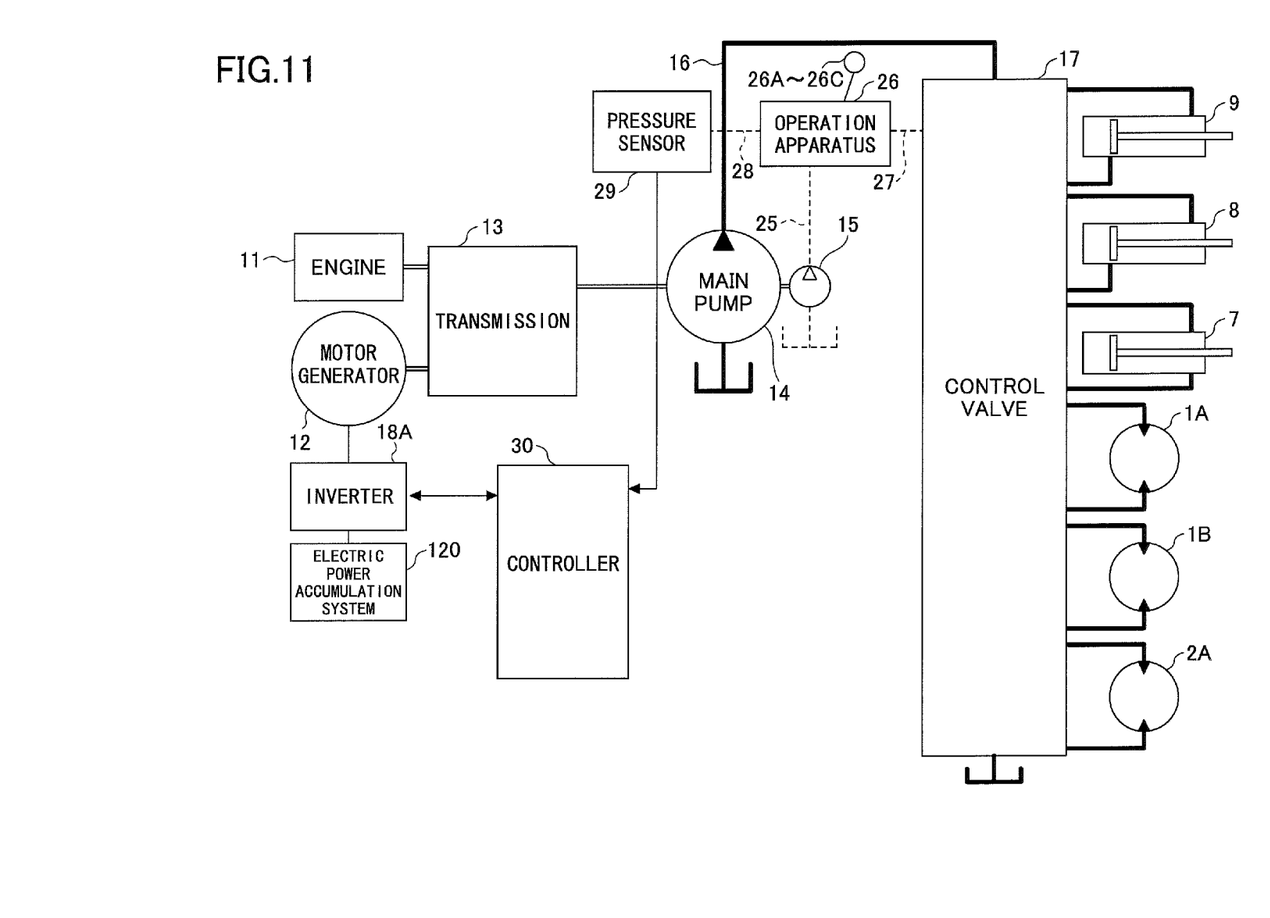
FIG. 11 is a block diagram illustrating a configuration of the drive system in the case where the hybrid hydraulic shovel illustrated in FIG. 2 employs a hydraulically driven turning mechanism.

While the turning mechanism 2 is electric in the above-described embodiments, the turning mechanism 2 may be driven not electrically but hydraulically. FIG. 11 is a block diagram illustrating a configuration of the drive system in the case where the hybrid hydraulic shovel illustrated in FIG. 2 employs a hydraulically driven turning mechanism. In the hybrid hydraulic shovel illustrated in FIG. 11, in place of the turning electric motor 21, a turning hydraulic motor 2A is connected to the control valve 17, and the turning mechanism 2 is driven by the turning hydraulic motor 2A. In this hybrid hydraulic shovel as well, it is possible to control the engine rotation speed and the assist amount of the motor generator (assist motor) with the above-described rotation speed variable control algorithms by directly outputting the electric power accumulator target output Pc determined from the state of charge SOC of the electric power accumulator in the requested assist output operation block 40-4 as the electric power accumulator compensation assist amount Pa2 as described above.

The present invention is not limited to the specifically disclosed embodiments, and variations and modifications may be made without departing from the scope of the present invention.

The present application is based on Japanese Patent Application No. 2010-226912, filed on Oct. 6, 2010, the entire contents of which are incorporated herein by reference.

INDUSTRIAL APPLICABILITY

The present invention may be applied to hybrid working machines that drive a variable flow rate hydraulic pump with the output of an engine.

DESCRIPTION OF THE REFERENCE NUMERALS 1 lower-part traveling body
1A, 1B traveling mechanism
2 turning mechanism
2A turning hydraulic motor
3 upper-part turning body
4 boom
5 arm
6 lifting magnet
7 boom cylinder
7A hydraulic pipe
8 arm cylinder
9 bucket cylinder
10 cabin
11 engine
12 motor generator
13 transmission
14 main pump
15 pilot pump
16 high-pressure hydraulic line
17 control valve
18, 18A, 18B, 20 inverter
19 battery
21 turning electric motor
22 resolver
23 mechanical brake
24 turning reduction machine
25 pilot line
26 operation apparatus
26A, 26B lever
26C pedal
27 hydraulic line
28 hydraulic line
29 pressure sensor
30 controller
40-1 hydraulic pump requested load estimation block
40-2 rotation speed operation block
40-3 assist output operation block
40-4 requested assist output operation block
40-5 assist command determination block
40-6 requested engine output operation block
120 electric power accumulation system
300 generator
310 hydraulic motor

The invention claimed is:

1. A hybrid working machine, comprising:
an engine fed with fuel;
a motor generator connected to the engine and driven by an inverter to assist the engine and to generate electric power;
a variable displacement hydraulic pump mechanically connected to the engine and configured to be driven to rotate by the engine; and
a control part configured to control the engine and the variable displacement hydraulic pump,
wherein the control part is configured to
estimate a hydraulic load of the variable displacement hydraulic pump based on a discharge pressure, a control current and a rotation speed of the variable displacement hydraulic pump,
calculate a target discharge flow rate of the variable displacement hydraulic pump based on the estimated hydraulic load,
calculate a rotation speed command for the engine based on the calculated target discharge flow rate of the variable displacement hydraulic pump and a tilt angle ratio of the variable displacement hydraulic pump, the tilt angle ratio being 90% to 100% of a maximum value of the tilt angle ratio,
control a rotation speed of the engine based on the calculated rotation speed command for the engine, and
determine an output of the motor generator based on the calculated rotation speed command for the engine.

2. The hybrid working machine as claimed in claim 1, wherein the control part is configured to
determine a target output of the engine based on the calculated rotation speed command for the engine,
determine an output of the variable displacement hydraulic pump required by the hydraulic load based on the discharge pressure and the calculated target discharge flow rate of the variable displacement hydraulic pump, and
determine the output of the motor generator by subtracting the target output of the engine from the output of the variable displacement hydraulic pump required by the hydraulic load.

3. The hybrid working machine as claimed in claim 1, wherein the control part is configured to
compare a first rotation speed command for the engine calculated based on the calculated target discharge flow rate and the tilt angle ratio of the variable displacement hydraulic pump and a second rotation speed command for the engine determined from a requested output of the engine, the second rotation speed command corresponding to a minimum rotation speed of the engine, and
control the rotation speed of the engine using a larger one of the first rotation speed command and the second rotation speed command.

4. The hybrid working machine as claimed in claim 3, wherein the requested engine output is calculated from the hydraulic load and an electrical load.

5. The hybrid working machine as claimed in claim 1, wherein the control part is configured to calculate the rotation speed command for the engine based on the calculated target discharge flow rate of the variable displacement hydraulic pump and a volume of the variable displacement hydraulic pump corresponding to the tilt angle ratio of the variable displacement hydraulic pump.

6. The hybrid working machine as claimed in claim 2, wherein the control part is configured to
calculate a maximum electric power feedable to the motor generator based on an electrical load, and
control the motor generator based on a larger one of the determined output of the motor generator and the calculated maximum electric power feedable to the motor generator.

7. A method of controlling a hybrid working machine, the hybrid working machine including an engine fed with fuel, a motor generator connected to the engine and driven by an inverter to assist the engine and to generate electric power, and a variable displacement hydraulic pump mechanically connected to the engine and configured to be driven to rotate by the engine, the method comprising:
estimating a hydraulic load of the variable displacement hydraulic pump based on a discharge pressure, a control current and a rotation speed of the variable displacement hydraulic pump;
calculating a target discharge flow rate of the variable displacement hydraulic pump based on the estimated hydraulic load;
calculating a rotation speed command for the engine based on the calculated target discharge flow rate of the variable displacement hydraulic pump and a tilt angle ratio of the variable displacement hydraulic pump, the tilt angle ratio being 90% to 100% of a maximum value of the tilt angle ratio;
controlling a rotation speed of the engine based on the calculated rotation speed command for the engine; and
determining an output of the motor generator based on the calculated rotation speed command for the engine.

8. The method of controlling a hybrid working machine as claimed in claim 7, further comprising:
determining a target output of the engine based on the calculated rotation speed command for the engine,
determining an output of the variable displacement hydraulic pump required by the hydraulic load based on the discharge pressure and the calculated target discharge flow rate of the variable displacement hydraulic pump, and
determining the output of the motor generator by subtracting the target output of the engine from the output of the variable displacement hydraulic pump required by the hydraulic load.

9. The method of controlling a hybrid working machine as claimed in claim 8, further comprising:
calculating a maximum electric power feedable to the motor generator based on an electrical load; and
controlling the motor generator based on a larger one of the determined output of the motor generator and the calculated maximum electric power feedable to the motor generator.

* * * * *